United States Patent
Zaifuddin et al.

(10) Patent No.: US 10,015,671 B2
(45) Date of Patent: Jul. 3, 2018

(54) NETWORK SERVICE ACCESS CONTROL

(71) Applicant: T-Mobile USA, Inc., Bellevue, WA (US)

(72) Inventors: Sabuhi Kiran Zaifuddin, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 15/000,269

(22) Filed: Jan. 19, 2016

(65) Prior Publication Data

US 2017/0208462 A1    Jul. 20, 2017

(51) Int. Cl.
*H04M 1/66* (2006.01)
*H04W 12/06* (2009.01)
(Continued)

(52) U.S. Cl.
CPC .......... *H04W 12/06* (2013.01); *H04W 12/02* (2013.01); *H04W 12/08* (2013.01); *H04W 12/12* (2013.01); *H04L 41/0668* (2013.01); *H04L 65/1006* (2013.01); *H04L 65/1016* (2013.01); *H04L 65/1069* (2013.01); *H04L 65/403* (2013.01); *H04W 76/12* (2018.02)

(58) Field of Classification Search
CPC ............. H04L 65/1069; H04L 65/1006; H04L 65/1089; H04L 65/403; H04L 69/24
See application file for complete search history.

(56) References Cited

U.S. PATENT DOCUMENTS

| 6,912,382 B2 | 6/2005 | Fellenstein et al. |
| 8,165,561 B2 | 4/2012 | Cai et al. |

(Continued)

FOREIGN PATENT DOCUMENTS

| EP | 1715625 | 10/2006 |
| WO | WO2011043526 | 4/2011 |

OTHER PUBLICATIONS

PCT Search Report and Written Opinion dated Apr. 25, 2017 for PCT Application No. PCT/US17/13010, 11 pages.
(Continued)

*Primary Examiner* — Barry W Taylor
(74) *Attorney, Agent, or Firm* — Lee & Hayes, PLLC; Robert C. Peck; Christopher J. White

(57) ABSTRACT

In some implementations, a telecommunications network can include an anchoring network device. The anchoring network device can receive, from a first party of a communication session, a service message including information of a first session attribute and associated with identification information of a party of the communication session. The anchoring network device can retrieve, from an authorization registry, authorization information corresponding to the identification information. In response to the authorization information indicating the first capability is not permitted, the anchoring network device can determine a status message based at least in part on the service message and transmit the status message via a communications interface. The status message can include a service-failure message or a second service message including information of a second, different session attribute.

14 Claims, 7 Drawing Sheets

(51) Int. Cl.
  *H04W 12/08* (2009.01)
  *H04W 12/02* (2009.01)
  *H04W 12/12* (2009.01)
  *H04L 29/06* (2006.01)
  *H04L 12/24* (2006.01)
  *H04W 76/12* (2018.01)

(56) References Cited

U.S. PATENT DOCUMENTS

| | | | |
|---|---|---|---|
| 8,270,346 B2 | 9/2012 | Olson | |
| 8,689,308 B2 | 4/2014 | Zhang et al. | |
| 2003/0045290 A1 | 3/2003 | Tuohimetsa et al. | |
| 2004/0022208 A1 | 2/2004 | Dahod et al. | |
| 2005/0120198 A1 | 6/2005 | Bajko et al. | |
| 2006/0203773 A1 | 9/2006 | Georges et al. | |
| 2006/0223501 A1 | 10/2006 | Van Moffaert et al. | |
| 2006/0271693 A1 | 11/2006 | Thiebaut et al. | |
| 2007/0124438 A1 | 5/2007 | Park et al. | |
| 2007/0189215 A1 | 8/2007 | Wu et al. | |
| 2007/0238468 A1 | 10/2007 | Buckley et al. | |
| 2007/0243876 A1 | 10/2007 | Duan | |
| 2008/0014956 A1 | 1/2008 | Balasubramanian | |
| 2008/0160995 A1 | 7/2008 | Thiebaut et al. | |
| 2008/0176552 A1 | 7/2008 | Hamano et al. | |
| 2008/0181198 A1 | 7/2008 | Yasrebi et al. | |
| 2008/0207181 A1 | 8/2008 | Jiang | |
| 2008/0268819 A1* | 10/2008 | Zhu | H04L 12/66 455/414.1 |
| 2008/0274735 A1 | 11/2008 | Choksi et al. | |
| 2009/0034536 A1* | 2/2009 | Morand | H04L 61/2015 370/400 |
| 2009/0049526 A1 | 2/2009 | Zhang et al. | |
| 2009/0083426 A1 | 3/2009 | Cagenius | |
| 2009/0088129 A1 | 4/2009 | Cai et al. | |
| 2009/0100147 A1 | 4/2009 | Igarashi | |
| 2009/0172782 A1 | 7/2009 | Taglienti et al. | |
| 2009/0213001 A1 | 8/2009 | Appelman et al. | |
| 2009/0285166 A1 | 11/2009 | Huber et al. | |
| 2009/0304009 A1 | 12/2009 | Kolhi et al. | |
| 2010/0046528 A1 | 2/2010 | Foti | |
| 2010/0112980 A1 | 5/2010 | Horn et al. | |
| 2010/0128685 A1 | 5/2010 | Jiang | |
| 2010/0130197 A1 | 5/2010 | Wu | |
| 2010/0223339 A1 | 9/2010 | Cheng et al. | |
| 2010/0312897 A1 | 12/2010 | Allen et al. | |
| 2011/0077058 A1 | 3/2011 | Cai et al. | |
| 2011/0103372 A1 | 5/2011 | Shatsky et al. | |
| 2011/0110331 A1 | 5/2011 | Keller et al. | |
| 2011/0116382 A1 | 5/2011 | McCann et al. | |
| 2011/0158090 A1 | 6/2011 | Riley et al. | |
| 2011/0165857 A1 | 7/2011 | Pihlajamaki et al. | |
| 2011/0231544 A1 | 9/2011 | Javenpaa et al. | |
| 2011/0264813 A1* | 10/2011 | Nair | H04L 65/1089 709/228 |
| 2011/0289217 A1 | 11/2011 | Prasad et al. | |
| 2011/0292839 A1* | 12/2011 | Swaminathan | H04L 65/1069 370/259 |
| 2012/0047262 A1 | 2/2012 | Laarakkers et al. | |
| 2012/0096115 A1 | 4/2012 | McColgan et al. | |
| 2012/0134323 A1 | 5/2012 | Perkuhn et al. | |
| 2012/0172037 A1 | 7/2012 | Zhu et al. | |
| 2012/0191847 A1 | 7/2012 | Nas et al. | |
| 2012/0202550 A1 | 8/2012 | Marsico | |
| 2012/0220330 A1 | 8/2012 | Goldner et al. | |
| 2012/0236760 A1 | 9/2012 | Ionescu et al. | |
| 2013/0083726 A1 | 4/2013 | Jain et al. | |
| 2013/0231107 A1 | 9/2013 | Mannepally | |
| 2014/0185521 A1 | 7/2014 | Aksu et al. | |
| 2014/0254491 A1 | 9/2014 | Lindholm et al. | |
| 2014/0254523 A1 | 9/2014 | Chai et al. | |
| 2014/0376511 A1 | 12/2014 | Kalapatapu et al. | |
| 2015/0163838 A1* | 6/2015 | Bouvet | H04W 76/021 370/329 |
| 2016/0021146 A1 | 1/2016 | Mufti et al. | |

OTHER PUBLICATIONS

3GPP TR 33.937 V13.0.0 (Jan. 2016) Technical Report, 3GPP Organizational Partners, Jan. 2016, pp. 1-6 and 48-50.
Garcia-Martin, M., et al., "3GPP SIP P-Header Exensions," The Internet Society, 2003, pp. 1-3 and 11-18.
ETSI TS 123 228 V12.8.0. "Digital cellular telecommunications system (Phase 2+); Universal Mobile Telecommunications System (UMTS); LTE; IP Multimedia Subsystem (IMS); Stage 2." ETSI, Mar. 2015, pp. 3-13, 27-31, 35-37, 46-48, 53, 67-68.
ETSI TS 124 229 V12.9.0. "Digital cellular telecommunications system (Phase 2+)." ETSI, Jul. 2015, pp. 3-28, 188-190, 214-216.
International Search Report and Written Opinion from International Application No. PCT/US2015/040818, dated Oct. 30, 2015, 10 pages.
Copeland, R., "FMC HSS—The IMS Brain," Huawei Technologies Ltd., Jan. 15, 2008, 6 pages.

* cited by examiner

NETWORK SERVICE ACCESS CONTROL

BACKGROUND

Many computing devices configured for telecommunications, such as smartphones, are capable of processing various types and encodings of media and interacting with various network services in addition to, e.g., two-party voice telephone calls. Examples of such media or services can include video calling or multi-party conferencing. Cellular and other portable communications devices may connect with networks of varying capability either within a communication session or between communication sessions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Some example systems and techniques described herein permit making effective use of available network bandwidth by controlling which services are provided over which networks to which computing devices. Some example systems and techniques described herein permit improving security of telecommunications networks and of users' telecommunication devices by preventing malicious software, e.g., smartphone viruses or other malware, from communicating with other telecommunication devices. This can reduce or inhibit the spread of malware.

Figure 1:
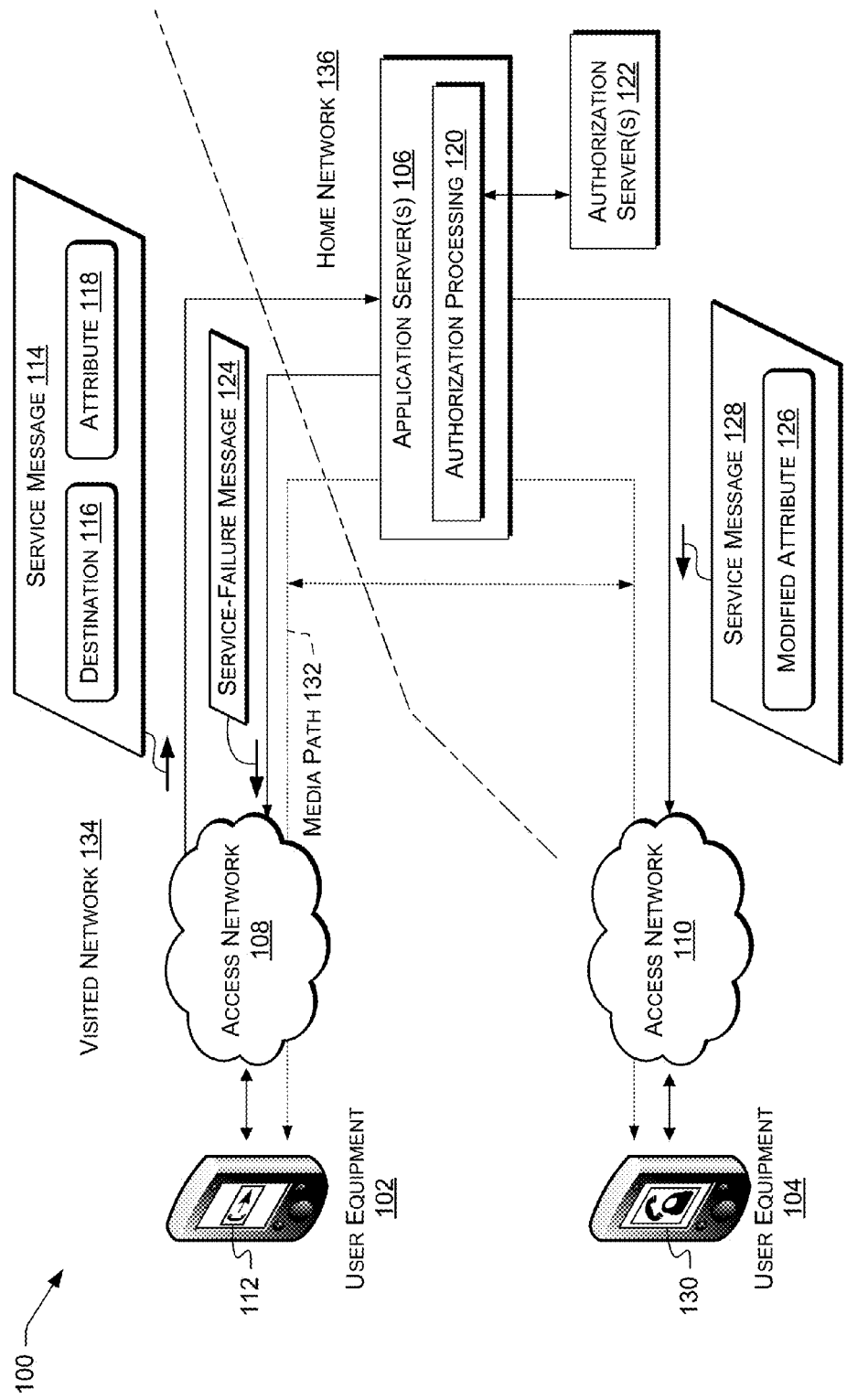
FIG. 1 is a block diagram illustrating a system for implementing network service access control according to some implementations.
Figure 3:
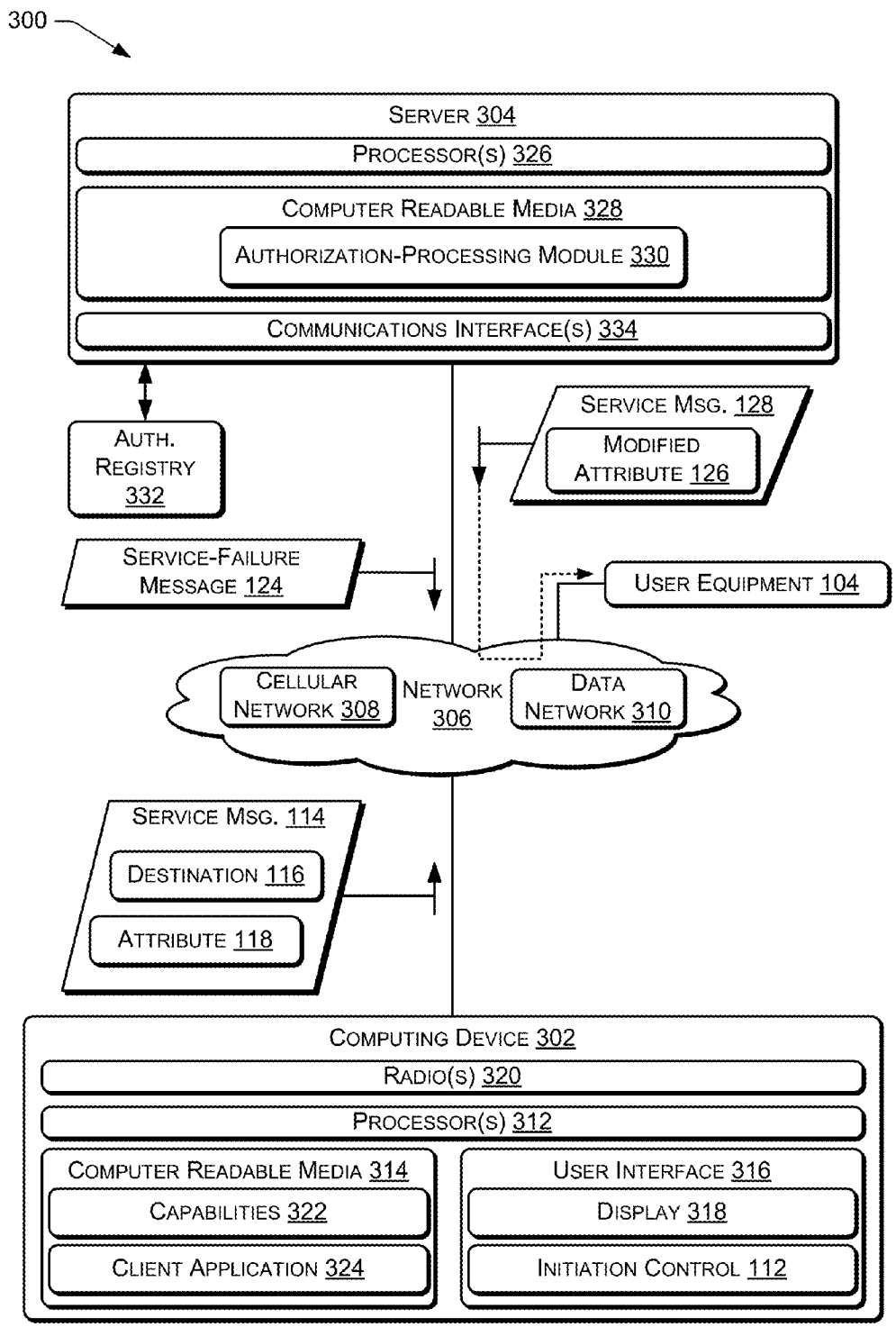
FIG. 3 is a block diagram illustrating a system for implementing service-access control according to some implementations.

The terms "user equipment," "UE," and "terminal" may be used interchangeably herein to describe any communication or computing device capable of performing techniques described herein, e.g., with respect to computing devices 102 and 104, FIG. 1, or computing device 302 or server 304, FIG. 3. Computing devices as described herein can be configured to perform techniques described herein with respect to, e.g., application server(s) 106 or authorization server(s) 122, FIG. 1.

The term "session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE carrying VoLTE sessions using Session Initiation Protocol (SIP) signaling, the public switched telephone network (PSTN) using Signaling System 7 (SS7) signaling, and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM and the PSTN are examples of circuit-switched (CS) networks; LTE and WIFI are examples of packet-switched (PS) networks.

As used herein, the term "capabilities" refers to data types, encodings, formats, bit rates, application protocols, underlying protocols, compression techniques, profiles, or coding/decoding procedure (codecs) that are supported by a terminal, or that are requested by a user or terminal and supported by other device(s) involved in a session, for the exchange of data with other computing devices, e.g., in a session. Example capabilities can include particular audio codecs (supported by a terminal) or call forking (requested by a user or terminal; supported by a core network device).

As used herein, a "party" is a terminal or a user employing a terminal. Sessions can include the transfer of messages between parties. Systems and techniques herein can permit controlling bandwidth usage and security by controlling which capabilities can be used on particular communication sessions. In some examples, the control is facilitated transparently to the intercommunicating computing devices.

As used herein, a message described as "associated with" a data item can include that data item, or can include information that, alone or in combination with other information, permits retrieval that data item. For example, a message can be associated with a destination network address, e.g., by including the destination network address or by including a destination hostname that can be used to retrieve a corresponding destination network address from a database (e.g., the Internet Domain Name System, DNS).

Many networks are "heterogeneous networks," i.e., networks including devices or transport systems with various sets of capabilities. For example, many Long Term Evolution (LTE) cellular networks support voice over LTE (VoLTE) and also interconnect with the PSTN. Voice calls over VoLTE are generally encoded and decoded using an adaptive multi-rate (AMR) codec. Narrowband AMR (NB-AMR), for example, encodes audio data in the frequency range of approximately 300 Hz-3400 Hz at a sampling rate of 8 kHz into compressed data at bit rates between 4.75 kbit/s and 12.2 kbit/s. By contrast, the PSTN generally carries uncompressed audio in the 400 Hz-3400 Hz band formatted according to the International Telecommunications Union (ITU) G.711 standard as uncompressed, 8-bit pulse code modulated (PCM) logarithmically-quantized samples. A voice call between a VoLTE device and a PSTN device therefore requires transcoding between NB-AMR and G.711, in this example, or requires the VoLTE device to encode audio data using G.711 rather than NB-AMR.

As new codecs and protocols are developed, voice calls between terminals may require transcoding, protocol conversion, or specific codec or protocol selection if one terminal or network supports a codec or protocol, such as AMR, that the other terminal or network does not. Similarly, transcoding or protocol conversion may be required for interworking with environments such as personal computers (PCs), which can use codecs such as Vorbis, e.g., in an Ogg container, or Opus, used in the WebRTC (Web Real-Time Communication) protocol.

Codecs are also used for video. Example codecs used in LTE networks include ITU H.263, Moving Picture Experts Group (MPEG) standards such as MPEG-4 part 2, and H.264/MPEG-4 part 10. However, many other video codecs are used in other environments, e.g., Theora, QUICKTIME, VP6, and VP8 in PC environments, and MPEG-1 and MPEG-2 in older PCs or telecommunication systems. Audio or video communications between devices with different codec capabilities may require transcoding or specific codec selection. Video transcoding, in particular, can be computationally expensive. Some examples herein can permit controlling access to video services, which can reduce the network and processing load of communication sessions.

As used herein, a "session attribute" is a type, identity, capability, or party of a communication session determined by or at the request of a party of the communication session, or determined in response to a message from a party of the communication session. For example, in a video call from Alice to Bob, the session attributes can include Alice as the originator, Bob as the recipient, and a video codec (e.g., H.263) that Alice and Bob's respective terminals are using to encode and decode the exchanged video. In another example, a text message from Dennis to Ken, the session attributes can include Dennis as the sender, Ken as the recipient, and a protocol identifier indicating whether the text message is being carried via the Short Message Service (SMS) protocol or the RCS Message Session Relay Protocol (MSRP). In still another example, a transfer of a party to a session, Alfred can call Peter. During the conversation, Peter may want to transfer Alfred to Brian. The session attributes when the transfer is initiated can include Alfred as the originating party, Peter as the terminating party, and Brian as the referred-to party. In yet another example, presence detection, Linus may wish to determine whether Alan is online. Linus's terminal may transmit a request for Alan's presence information to a presence server. The session attributes can include Linus as the originating party, Alan as the target party, and "presence request" as the type of communication session. In still another example, Grace and Ada may wish to stream audio of a symphonic performance. The session attributes can include Grace, Ada, and the symphony's server as parties, Advanced Audio Coding (AAC) as an audio-codec capability, and a quality of service (QoS) level indicating a required bandwidth of 320 kbit/s for the audio stream.

In some examples, an anchoring network device, e.g., an application server (AS), is communicatively connectable with cellular user equipment (UE) or another computing device or terminal. The anchoring network device can be configured to receive, from a first party of a communication session, a service message including information of a first session attribute and associated with identification information of a party of the communication session. The anchoring network device can retrieve, from an authorization registry, authorization information corresponding to the identification information. In response to the authorization information indicating the first capability is not permitted, the anchoring network device can determine a status message based at least in part on the service message, and transmit the status message via a communications interface.

Some prior schemes control access to services using initial filter criteria (IFCs). However, this is a very coarse level of control, restricted to determining service access based on explicitly-stated SIP header contents. For example, specific visited networks identified in the P-Visited-Network-ID (PVNI) header can be referenced by IFCs. However, even if per-visited-network service blocking could be implemented using IFCs, one IFC would be required per country, per operator. Any such set of IFCs would require large amounts of storage and large amounts of processing time on call setup, thus delaying the establishment of each and every communication session by a user having such a large set of IFCs.

Furthermore, PVNI may be included only in registration requests (RFC 3455, sec. 4.3.2), so PVNI is not necessarily available for use by IFCs in all SIP messages initiating communication sessions. Moreover, IFCs cannot route based on information transferred by non-SIP protocols such as Lightweight Directory Access Protocol (LDAP), Simple Object Access Protocol (SOAP) over Hypertext Transfer Protocol (HTTP), or Diameter. Also, IFCs are only applied when a session is initiated and are not useful for session attributes that may change during the course of a session.

FIG. 1 is a block diagram illustrating a telecommunication system 100 according to some examples. The system includes computing devices 102 and 104, e.g., user equipment or other mobile phones or communications devices or terminals. The computing devices 102 and 104 can be operated, e.g., by a user and a first user respectively (not shown). The computing devices 102 and 104 are communicatively connected to one or more application server(s) 106, e.g., via respective access networks 108 and 110. The application server(s) 106 can include, e.g., a telephony application server (TAS) of an Internet Protocol (IP) Multimedia Subsystem (IMS) in a VoLTE-capable network.

The computing devices 102 and 104 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 may represent various types of communication devices that are generally stationary as well, such as televisions, desktop computers, game consoles, set top boxes, and the like. User equipment can include user cellular equipment or other telecommunications or computing devices communicatively connectable with other computing devices via one or more application server(s) 106. Mobile phones and copper-loop landline phones can be examples of user equipment.

When the first user desires to place a call to the second user, the computing device 102, e.g., in response to actuation by the first user of a "Send" control 112, transmits an initiation request. The initiation request is an example of a service message 114 of a communication session. Service message 114 can also be transmitted during a communication session, e.g., to transfer a file or switch between audio and video calling.

The illustrated service message 114, e.g., an outgoing voice call, includes information of a destination 116, i.e., a computing device 104 with which computing device 102 is requesting a session be established. In this example, only one destination is shown, namely the computing device 104. However, the service message 114 can specify any number of destinations. The illustrated service message 114 also includes information 118 of a first session attribute, e.g., one or more media capabilities of the computing device 102 or protocol types of the communication session. The information 118 of the first session attribute is also referred to as an "offer." In an example, the service message 114 includes a SIP INVITE message having a Session Description Protocol (SDP) body including a session description, e.g., the information 118 of the session attribute. In an example, the session description specifies whether voice or video calling is desired.

The application server(s) 106 receive from the computing device 102 the service message 114 and perform authorization processing 120, described below with reference to FIGS. 2-7. As described below, in some examples, the application server(s) 106 interact with one or more authorization server(s) 122 to perform the authorization processing 120. In some examples, the authorization server(s) 122 include an Equipment Identity Register (EIR) or Enhanced EIR (EEIR) communicatively connected with the application server(s) 106.

In some examples, based, on the information 118 of the capabilities, the authorization processing transmits a service-failure message 124 to the computing device 102. The service-failure message 124 indicating the session cannot be established, or the requested attribute is not supported. This can be an example of disallowing the first session attribute indicated by the information 118.

In some examples, the authorization processing 120 modifies the information 118 of the session attribute or otherwise determines information 126 of a second session attribute different than the session attribute in service message 114, e.g., based on an indication of a network to which computing device 102 is connected. The application server(s) 106 then transmits a second service message 128 including the information 126 of the second session attribute, e.g., to the computing device 104. This can be an example of modifying or downgrading a session attribute.

The computing device 104 thus receives a service message 128 including modified information 126 of the session attribute. In the example of a session initiation message, the computing device 104 can respond, e.g., by alerting the second user and transmitting a SIP 180 Ringing response to the computing device 102. The user of the computing device 104 can then indicate the call should be accepted, e.g., by operating a call-acceptance control 130 such as a touch-screen button. The computing device 104 can then accept the service message, e.g., by sending a SIP 200 OK response to the computing device 102. Call initiation can be performed, e.g., as defined in the Global System for Mobile (GSM) or Voice-over-Long Term Evolution (VoLTE) standards, and can include the exchange of additional messages (not shown) between the computing devices 102 and 104 and the application server(s) 106. Data of the session, such as audio data or video data formatted as specified in the modified information 126, can be exchanged between computing devices 102 and 104 via a communications channel depicted as media path 132, which, as shown, can pass through application server(s) 106 or can bypass application server(s) 106.

In some examples, as represented by the bent dashed line, UE 102 is roaming in, or otherwise connected to, a visited network 134 while transmitting the first service message 114. The visited network 134 can include a visited public land mobile network (VPLMN). In some examples, application server(s) 106 or authorization server(s) 122 are located in or part of a home network 136. The visited network 134 can include a home public land mobile network (HPLMN). In some examples, UE 102 is configured so that any network other than home network 136 is a visited network such as visited network 134. Various examples herein relate to home-routed services, in which application server(s) 106 of home network 136 anchor or control communication sessions of which UE 102 is a party, even when UE 102 is roaming in visited network 134. In FIG. 1, access network 110 can be part of visited network 134, home network 136, or another network.

Various examples herein permit interworking advanced techniques with installed equipment not supporting those techniques. For example, various techniques herein permit interworking EVS codecs on a VoLTE network with non-EVS-capable VoLTE user equipment or CS user equipment. Various examples herein permit interworking between cellular and PC environments. Various examples herein permit removal or modification of session attributes that are applicable to the calling party's network, computing device, or environment, but not applicable to the called party's network, computing device, or environment (e.g., VoIP calls from a Web browser or IPAD application using Opus via a WebRTC gateway to an IMS subscriber, or vice versa). Such interworking can permit introducing new voice-enhanced codecs or other capabilities, e.g., in a home network, without causing compatibility problems with a visited network. Various examples herein permit removal or modification of session attributes that are applicable to a user's home network or environment, but not applicable to a network or environment in which a user is roaming. Various examples herein permit controlling bandwidth usage and network congestion by controlling which services are available to which parties on which networks. Various examples herein permit controlling service access based on, e.g., user, visited network and device type (or any combination of any of those).

In some examples, a user or terminal may be known to be either malicious or vulnerable. For example, a zero-day vulnerability may be uncovered in an application running on a number of terminals, and those terminals may be subject to attack by malicious parties until the application is updated to fix the vulnerability. In some examples, session attributes related to the vulnerable application may be downgraded or disallowed so that the vulnerable application is not invoked. This can remove opportunities for malicious parties to exploit the vulnerability. In some examples, if an application on a particular terminal is infected by malware, e.g., a virus or worm, session attributes originated by that application on that terminal can be disallowed or downgraded to reduce the number of vectors available for the malware to infect other applications or terminals. In some examples, if a terminal is infected or malicious, call transfers to that terminal can be disallowed to reduce attack vectors from that terminal to other terminals.

In some examples, disallowing or downgrading session attributes can permit regulating bandwidth usage by subscribers or terminals. For example, high-bandwidth services can be disallowed or downgraded on congested networks to maintain QoS levels.

Figure 2:
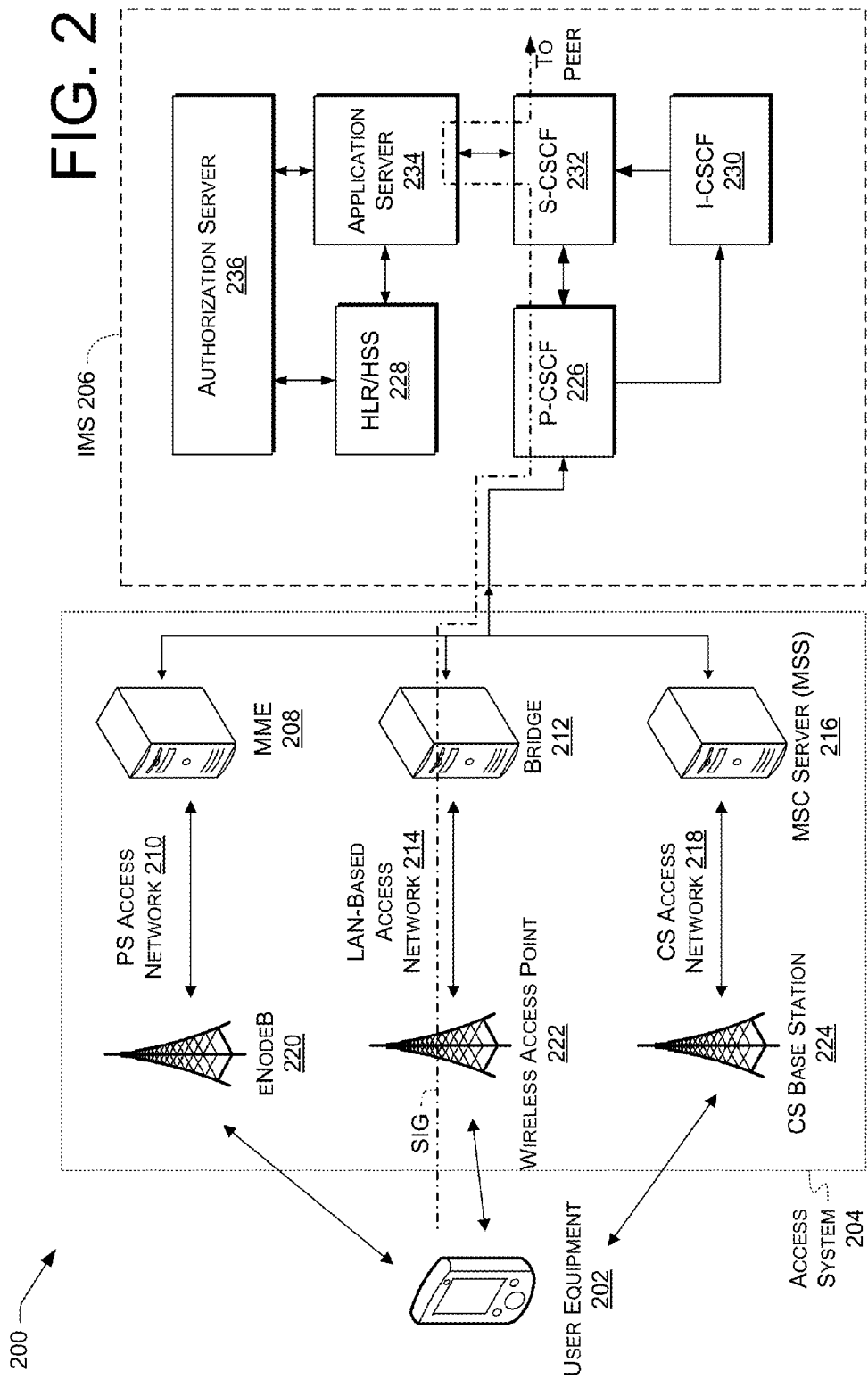
FIG. 2 illustrates an example telecommunications network, including components used to perform service-access control of a communication session.

FIG. 2 illustrates an example telecommunications network 200. User equipment 202 communicates with access system 204 of the telecommunications network. Access system 204 can include a first access network of a first type (e.g., LTE) and a second access network, e.g., of a second, different type (e.g., WIFI). Each of the first access network and the second access network can be configured to selectively carry a communication session of user equipment 202. For example, voice calls can be carried over the first access network using voice-over-LTE (VoLTE) and over the second access network using voice-over-WIFI (VoWIFI). In some examples, the first type is a PS cellular type and the second type is a PS local-area-network type. IMS 206 communicates with access system 204 and provides media-handling services, e.g., to route video or voice data or to maintain continuity of the communication session during handover of the communication session.

In the illustrated example, access system 204 includes at least a mobility management entity (MME) 208 associated with a PS access network 210, a bridge 212 (or other packet relay) associated with a LAN-based access network 214, or a mobile switching center (MSC) server (MSS) 216 associated with a CS access network 218.

The PS access network 210, e.g., an LTE access network, may include an eNodeB 220, e.g., a 4G base station or other access point, that provides connectivity to the PS access network 210. The LAN-based access network 214, e.g., a WIFI network, may include a wireless access point (WAP) 222, e.g., a WIFI WAP, that provides connectivity to the LAN-based access network 214. The CS access network 218 may include a CS base station 224 that provides connectivity to the CS access network 218. The IMS 206 of the telecommunications network may include a number of nodes, such as a proxy call session control function (P-CSCF) 226, a home location register (HLR)/home subscriber server (HSS) 228, an interrogating call session control function (I-CSCF) 230, a serving call session control function (S-CSCF) 232, an application server (AS) 234, e.g., a TAS, and an authorization server 236. The authorization server 236 can alternatively be located outside the IMS 206 and be communicatively connected with the IMS 206. The authorization server 236 can be or include, e.g., an HSS, an equipment identity register (EIR), an enhanced EIR (EEIR), a DNS server, or an E.164 Number Mapping (ENUM) server.

The telecommunications network may also include a number of devices or nodes not illustrated in FIG. 2. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 206 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

The telecommunications network may provide a variety of services to user equipment 202, such as synchronous communication routing across a public switched telephone network (PSTN). Further services may include call control, switching, authentication, billing, etc. In at least one example, IMS 206 functions and devices communicate using specific services provided by the access system 204 or elements thereof, but are not directly tied to those specific services. For example, IMS 206 devices can intercommunicate using an EPC network, a GSM network, a SONET network, or an Ethernet network.

In initializing a communication session, the user equipment 202 may register the communication session with the IMS 206 of the telecommunications network. To do this, the user equipment 202 sends an initiation SIP REGISTER request to the IMS 206 via an access network, e.g., via the eNodeB 220 and MME 208 of the PS access network 210. The P-CSCF 226 of the IMS 206 may receive the SIP REGISTER request. P-CSCF 226 may forward the REGISTER request directly to S-CSCF 232, or may forward the request to I-CSCF 230, which can locate an appropriate S-CSCF 232, e.g., using stored database information, and forward the REGISTER request to the located S-CSCF 232. In some examples, the P-CSCF 226 is located in a visited network of UE 202 and the I-CSCF 230 and S-CSCF 232 are located in a home network of UE 202. The S-CSCF 232 or other components (omitted for brevity) of the IMS 206 can store information about the user equipment 202 in the HLR/HSS 228 and then send a SIP response to the user equipment 202 to complete the IMS registration of the communication session.

In an example of session-control services, a signaling path ("SIG") of the communication session passes through P-CSCF 226, S-CSCF 232, and AS 234, as indicated by the dash-dot arrow. After AS 234, the example SIP signaling path passes back through S-CSCF 232 to a peer (not shown). In an example in which UE 202 is an originating (MO) UE, the peer can be, e.g., an S-CSCF corresponding to a terminating (MT) UE (omitted for brevity). As shown, in this example, the signaling path does not reach the authorization server 236. In the illustrated example, the AS 234 is an anchoring network device and proxies signaling traffic for the communication session, e.g., operating as a SIP proxy or back-to-back user agent (B2BUA). In another example, the MSS 216 can be the anchoring network device and can proxy signaling traffic for the communication session, e.g., GSM or SS7 signaling traffic. In some examples, the anchoring network device can include an IP-Short Message (SM) Gateway AS or a Rich Communications Services (RCS) AS. In some examples, the anchoring network device can be included in or integrated with a TAS or other core network device. In some examples, an anchoring network device can include a Telephony Application Server (TAS) or Rich Communication Suite (RCS) anchoring network device.

The AS 234 (or other anchoring network device, and likewise throughout) can provide session-control services to UE 202. In some examples, the AS 234 is configured to communicate with authorization server 236, e.g., an HSS, EIR, or EEIR, via the Diameter protocol, e.g., over the LTE Sh interface or other appropriate interfaces. Examples of AS 234 functions are described in more detail below with reference to FIGS. 3-7.

In some examples, the AS 234 or the authorization server 236 can include a memory, e.g., a computer-readable memory, storing a mapping between identification information and authorization information. The AS 234 or authorization server 236 can be configured to receive a modification instruction and modify the mapping in response to the modification instruction. This can permit dynamically updating the authorization information, increasing flexibility of the telecommunications network.

Session attributes can be indicated, e.g., in a header or body of a SIP request or response, such as a Session Description Protocol (SDP) body. The session attributes can include at least an access-network type of the communication session, a device type of user equipment 202 participating in the communication session, a media capability of the user equipment 202 (e.g., whether or not the UE 202 supports video, or which codecs the UE 202 supports), a virtual-network identifier of the user equipment (e.g., identification of a mobile virtual network operator, MVNO, of UE 202), or an authentication type of the user equipment (e.g., SIM-based or other).

In some examples, such as for IMS-capable users registering via a CS access network 218, the anchoring network device can receive an indication of user equipment 202, e.g., from MSS 216. The anchoring network device can transmit a request for registration information corresponding to the user equipment. The request can be transmitted, e.g., to HLR/HSS 228. The anchoring network device can, in response to the transmitted request, receive a message, e.g., a Diameter message, indicating session attributes of communication sessions in which UE 202 may participate. This can permit providing capability-specific session-control services even to terminals that are not transmitting SIP signaling.

The devices and networks illustrated in FIG. 2 can be examples of the devices and networks illustrated in FIG. 1 and described above. For instance, UE 202 can represent computing device 102 or 104, any of PS access network 210, LAN-based access network 214, or CS access network 218 can represent access network 108 or 110, application server 234 can represent application server(s) 106, or authorization server 236 can represent authorization server(s) 122.

Also, the eNodeB 220 can be an access point for the PS access network 210, and the CS base station 224 can be a base station for the CS access network 218. Accordingly, the descriptions of the devices and networks of FIG. 1 apply to the devices and networks of FIG. 2. The devices and networks of FIG. 2 may cooperate to accomplish session control, e.g., as shown in FIG. 1 and described herein. They may also cooperate to accomplish the initialization of a communication session of user equipment 202.

FIG. 3 is a block diagram illustrating a system 300 permitting authorization processing based on session attributes according to some implementations. The system 300 includes a computing device 302, e.g., a wireless phone or other user equipment such as computing device 102 or 104, FIG. 1, coupled to a server 304 via a network 306. The server 304 can represent the application server(s) 106, FIG. 1 or the AS 234, FIG. 2, e.g., a TAS, an RCS AS, a short message service center (SMSC), a presence server, or a conferencing server.

The network 306 can include one or more networks, such as a cellular network 308 and a data network 310. The network 306 can include one or more core network(s) connected to user equipment via one or more access network(s). Example access networks include LTE, WIFI, GSM EDGE Radio Access Network (GERAN), UMTS Terrestrial Radio Access Network (UTRAN), and other cellular access networks. Service access control as described herein can be performed, e.g., for services provided via 2G, 3G, 4G, WIFI, or other networks. Service access control can be performed with respect to any party known to the network, e.g., any party registered in an IMS.

The cellular network 308 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 304 and computing devices such as the computing device 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("Bluetooth"), Asynchronous Transfer Mode (ATM), WIMAX, and other network technologies, e.g., configured to transport Internet Protocol (IP) packets. In some examples, the server 304 includes or is communicatively connected with an interworking function (IWF) or other device bridging networks, e.g., LTE, third-generation cellular (3G), and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using Voice over Internet Protocol (VoIP) or other technologies as well as data traffic, or the cellular network 308 can carry data packets using High Speed Packet Access (HSPA), LTE, or other technologies as well as voice traffic. Some cellular networks 308 carry both data and voice in a PS format. For example, many LTE networks carry voice traffic in data packets according to the voice-over-LTE (VoLTE) standard. Various examples herein provide origination and termination of, e.g., carrier-grade voice calls on, e.g., networks 306 using CS transports or mixed VoLTE/3G transports, or on computing devices 302 including original equipment manufacturer (OEM) handsets and non-OEM handsets.

The computing device 302 can be or include a wireless phone, a wired phone, a tablet computer, a laptop computer, a wristwatch, or other type of computing device. The computing device 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 314, such as memory (e.g., random access memory (RAM), solid state drives (SSDs), or the like), disk drives (e.g., platter-based hard drives), another type of computer-readable media, or any combination thereof. The computing device 302 can further include a user interface (UI) 316, e.g., including an electronic display device 318, a speaker, a vibration unit, a touchscreen, or other devices for presenting information to a user and receiving commands from the user. The user interface 316 can include a session-initiating user interface control 112, e.g., a touchscreen button, to indicate a communication session should be initiated. The user interface 316 or components thereof, e.g., the display 318, can be separate from the computing device 302 or integrated (e.g., as illustrated in FIG. 1) with the computing device 302. The computing device 302 can further include one or more radio(s) 320 configured to selectively communicate wirelessly via the network 306, e.g., via an access network 108 or 110, or one or more transceivers (not shown) configured to selectively communicate using wired connections via the network 306.

The computer readable media 314 can be used to store data and to store instructions that are executable by the processors 312 to perform various functions as described herein. The computer readable media 314 can store various types of instructions and data, such as an operating system, device drivers, etc. The processor-executable instructions can be executed by the processors 312 to perform the various functions described herein.

The computer readable media 314 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program modules, or other data.

The computer readable media 314 can store information 322 of one or more capabilities or preferred or available session attributes of the computing device 302. The information 322 can include, e.g., indications of voice or video codecs supported by the computing device 302. The computer readable media 314 can additionally or alternatively store credentials (omitted for brevity) used for access, e.g., to IMS or RCS services.

The computer readable media 314 can include processor-executable instructions of a client application 324. The client application 324, e.g., a native or other dialer, can permit a user to originate and terminate communication sessions associated with the computing device 302, e.g., a wireless phone. The client application 324 can additionally or alternatively include an SMS, RCS, or presence client, or a client of another telephony service offered by the server 304. In some examples, the client application 324 can include computer instructions executable to cause the computing device 302 to transmit the service message 114 indicating the destination 116 and the information 118 of the session attribute to the server 304. The server 304 can receive from the computing device 302 or other user equipment the service message 114 of a communication session, e.g., as discussed above with reference to FIG. 1.

The server 304 can include one or more processors 326 and one or more computer readable media 328. The computer readable media 328 can be used to store processor-executable instructions of an authorization-processing module 330. The processor-executable instructions can be executed by the processors 326 to perform various functions described herein. In some examples (not shown), the computer readable media 328 or another component of the server 304 also stores an authorization registry, discussed below. In some examples, the server 304 is communicatively connected with an authorization registry 332 separate from the server 304. The server can retrieve information from the authorization registry via, e.g., a SIP MESSAGE request, a SIP NOTIFY request (and corresponding SIP 200 OK response from the queried registry) or an HTTP request such as a GET to a Web Services or Representational State Transfer (REST) application programming interface (API) endpoint. In some examples, server 304 can communicate with computing device 302, authorization registry 332, or other devices via one or more communications interface(s) 334, e.g., network transceivers for wired or wireless networks, or memory interfaces. Example communications interface(s) 334 can include ETHERNET or FIBRE CHANNEL transceivers, WIFI radios, or DDR memory-bus controllers (e.g., for DMA transfers to a network card installed in a physical server 304).

The authorization registry 332 (or an authorization registry internal to server 304, and likewise throughout) can include a database storing authorization information, such as information of permitted or forbidden session attributes. The information in the authorization registry 332 can be stored in association with, or keyed by, identification information of one or more parties of a communication session. The server 304 can thus be configured to (e.g., by executing instructions stored in computer-readable media 328) retrieve from the authorization registry 332 authorization information corresponding to the identification information. The authorization information can specify one or more session attributes that are prohibited, e.g., one or more codecs or RCS services.

In some examples, in response to the first service message 114 associated with a communication session, new or existing, the server 304 can retrieve authorization information, e.g., from authorization registry 332. The authorization information can correspond to identification information of one or more parties of the communication session, e.g., computing device 302 or a user thereof. In some examples, the identification information can include at least one of a terminal identifier such as an international mobile equipment identity (IMEI), a user identifier such as an international mobile subscriber identity (IMSI), a network identifier such as a mobile country code (MCC) and a mobile network code (MNC), a user address such as an E.164 international-dialing-plan telephone number, mobile station international subscriber directory number (MSISDN), or network address, such as an Internet IPv4 or IPv6 address, or a country code, e.g., indicating a country in which computing device 302 is located.

The first service message can include information 118 of a first session attribute. The server 304 can, using the authorization information, determine whether the first session attribute is permitted in the communication session. In some examples, server 304 can look up the identification information, the first session attribute, or a combination thereof in authentication registry 332 to determine whether the first session attribute is permitted in the communication session. In some examples, server 304 can receive, from a profile server such as HSS 228, service-access information associated with a user of computing device 302 or other user equipment that transmitted the first service message 114. Server 304 can then look up at least the identification information or the first session attribute in the service-access information to determine whether the user is authorized to use the first session attribute, e.g., to participate in communication sessions having that session attribute. If the user is not authorized, the session attribute is not permitted in the communication session, at least with respect to that user.

In some examples, if the first session attribute is not permitted in the communication session, the server 304 can determine a second session attribute different from the first session attribute based at least in part on the first session attribute. For example, the second session attribute can include a "downgraded," e.g., less capable, attribute corresponding to the first session attribute. Examples are discussed below with reference to FIG. 4. For example, the server 304 can retrieve the second session attribute from a downgrade-information table or other data store.

In some examples, the downgrade information can be stored or transmitted with or within the authorization information. The downgrade information can include the second session attribute associated with a requested first session attribute. Additionally or alternatively, downgrade information can be stored on computer-readable media 328 or other computer-readable media, e.g., on server 304 or communicatively connected to server 304.

The server 304 can transmit a second service message including information 126 of the second session attribute, e.g., to computing device 302, computing device 104 (user equipment; indicated by a dashed arrow), or in general to one or more parties of the telecommunication session. In some examples, the user equipment (e.g., computing device 302) can be associated with a first party of the telecommunication session and the one or more parties can include a second party different from the first party. In some examples, computing device 302 can be an originating terminal of the communication session, a terminating terminal of the communication session, or a participating terminal, e.g., involved in a multiparty conference session.

In some examples, the first session attribute and the second session attribute can include respective capabilities. In some of these examples, the first session attribute is a video capability and the second session attribute is an audio capability. For example, if the authorization information indicate the first session attribute, e.g., video calling, is not permitted, the second attribute can be determined to be audio calling. This can permit communications between parties even if a particular requested form of communication is not authorized.

In some examples, the first session attribute comprises a first set of one or more parties. For example, some telecommunications networks support "call forking," in which a single call placed to a user's telephone number causes multiple devices to ring. This can permit, e.g., one number to ring on both a user's home and work phones and the user's assistant's phone, e.g., substantially simultaneously, or sequentially as part of a hunt group. In some examples, the second session attribute comprises a second set of one or more parties including fewer than all of the parties in the first set of one or more parties. For example, depending on the identification information, e.g., the access network to which the computing device 302 is connected, the server 304 can determine that forking should occur to fewer than all of the numbers in the first set. This can, e.g., permit reducing network congestion by prohibiting forking to terminals connected via low-bandwidth or highly-congested access networks.

In some examples, the first session attribute and the second session attribute comprise respective protocols, e.g., respective, different protocols. For example, the first session attribute can specify that messages be sent via MSRP. If RCS is not available or preferred, the server 304 can determine the second session attribute as SMS or multimedia message service (MMS). This can permit users to exchange messages even when the preferred RCS functionality is not available, and can permit carriers to control bandwidth usage by controlling when RCS is available. In another example, the first session attribute can specify that an LTE transport be used for IP packets. If the LTE core is inaccessible, e.g., due to maintenance or an outage, the server 304 can determine the second session attribute specifying that GPRS or HSPA be used to carry the packets. This can reduce user wait times and radio congestion by removing time and channel occupancy that computing device 302 or a peer computing device such as UE 104 might otherwise spend attempting unsuccessfully to communicate via LTE.

In some examples, the first session attribute can specify that SMS messages be sent via a PS data network. If a packet network is not available or reliable, the server 304 can determine the second session attribute indicating the SMS messages should be sent via a CS network using, e.g., a CS retry.

In some examples, if the first session attribute is not permitted in the communication session, the server 304 can transmit a service-failure message to computing device 302 indicating that the requested attribute is not available, e.g., as discussed below with reference to FIG. 5.

In some examples, e.g., of transferring a call, the first session attribute can include a referred-to party of a call transfer. The server 304 can determine the service-failure message including an indication that transfer to the referred-to party is prohibited. This can, e.g., reduce spam calls initiated by malware.

In some examples, e.g., of some RCS networks or other networks capable of maintaining user presence information (e.g., online vs. offline), the first session attribute comprises presence information of a user of computing device 302. The server 304 can be configured to determine the service-failure message including an indication that the presence information may not be published, e.g., in a presence registry. This can control bandwidth usage, e.g., by reducing visibility of users on low-bandwidth or congested networks and therefore reducing instant-message traffic sent to those users.

In some examples involving presence information, e.g., of an MT UE, the first session attribute can include a presence-query session type. In an example, the first service message 114 can include a SIP OPTIONS request, e.g., from the computing device to a user of interest. The server 304 can be configured to determine the service-failure message including an indication that presence information may not be retrieved. For example, the server 304 can determine the service-failure message including a SIP 4xx, 5xx, or 6xx response other than a SIP 404, 408, 480, or 604 response.

In some examples, the server 304 can transmit the determined service-failure message 124 (FIG. 1), e.g., a SIP 488 Not Acceptable response, to the computing device 302 originating the communications session. In some examples, the service-failure information can provide the computing device 302 information about the reason for the failure. This can permit the originating computing device 302 to retry the session initiation using a codec or other session attribute likely to correspond, or known to correspond, with the capability information of the terminating device or network. In some examples, the service-failure message 124 can indicate one or more of the session attributes that are prohibited. This permits the originating computing device 302 to retry the service request without using a session attribute known to be disallowed.

Figure 4:
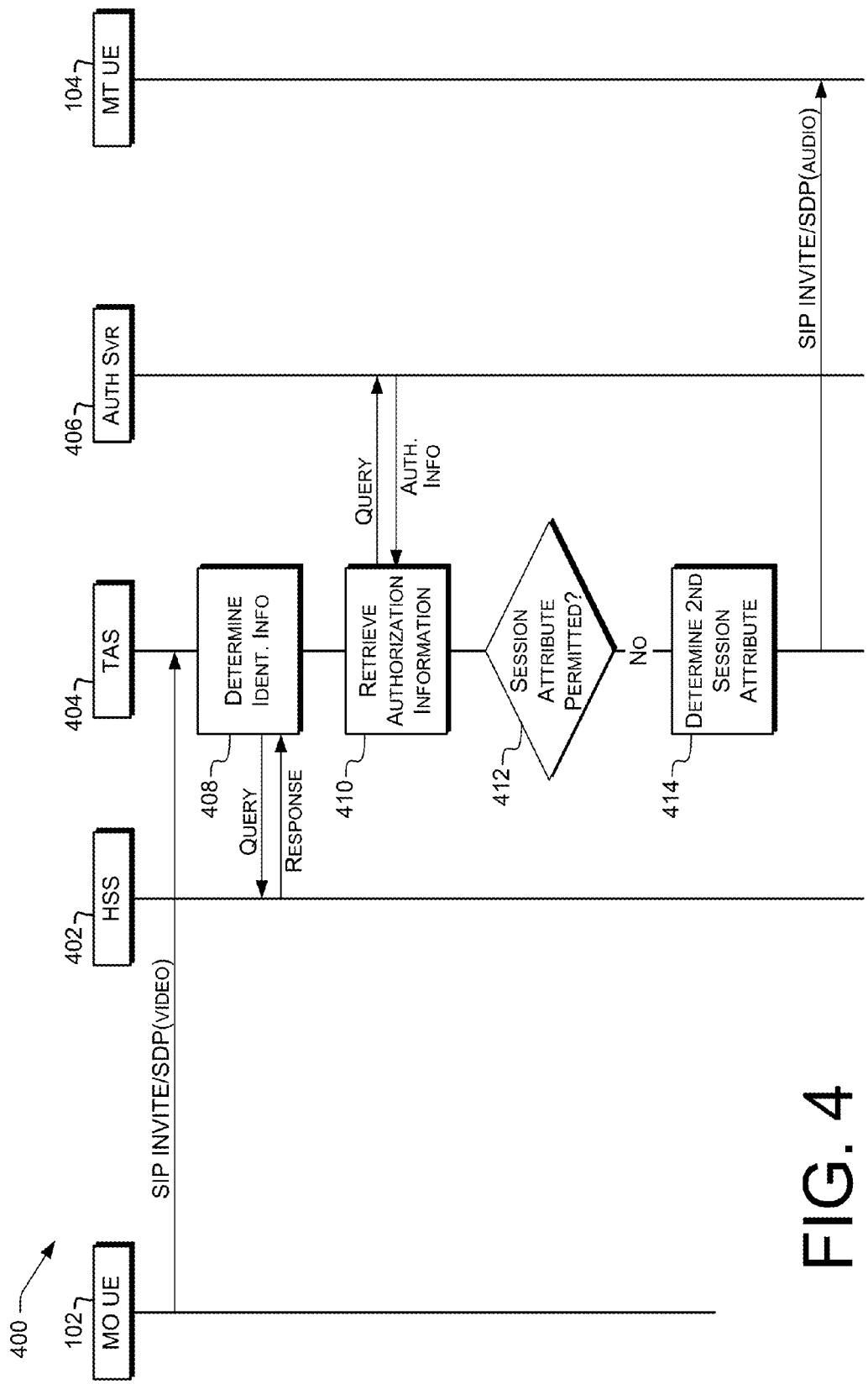
FIG. 4 shows an example call flow illustrating downgrade of requested services.

FIG. 4 shows a call flow 400 illustrating an example downgrade of a service request of a session. The illustrated session is from originating (MO) UE (e.g., computing device 102) to a terminating (MT) UE (e.g., computing device 104). The terms "MO" and "MT" are used herein for brevity and do not require any device so identified be a mobile device. Several core network devices are shown, including an HSS 402, a telephony application server (TAS) 404, which is an example of an anchoring network device, and an authentication server 406, e.g., an EEIR. Not all core network devices are shown. In some examples omitted for brevity, functions described below with reference to TAS 404, which is communicatively connected with MO UE 102, can additionally or alternatively be performed with a terminating TAS communicatively connected with MT UE 104. In some examples, both the originating TAS 404 and the terminating TAS can check authorization information and disallow or downgrade as described herein.

As shown, the MO UE 102 sends a first service message, in this example a session-initiation request in the form of a SIP INVITE with an SDP message body. The TAS 404 receives, from the user equipment (MO UE 102), the first service message associated with the new communication session to be established. The first service message includes information of a first session attribute. In this example, the first service message requests a video call, e.g., by including an "m=video" line in the SDP body.

As noted above, the first service message can additionally or alternatively be associated with an existing communication session. For example, the first service message can be transmitted in an existing communication session to add attributes to that session, e.g., to transfer a file or send an instant message. Any number of first service messages and corresponding status messages, e.g., service-failure messages 124 or second service messages 128, can be transmitted in a particular communication session.

At block 408, TAS 404 determines identification information of one or more parties of the communication session. For example, as noted above, the identification information can include a terminal identifier such as an IMEI, a user identifier such as an IMSI, a network identifier such as an MCC/MNC pair, a user address such as an E.164 or IP address, or a country code. In some examples, the identification information can include an identifier of a Mobile virtual network operator (MVNO) determined from the IMSI of MO UE 102 or MT UE 104. In some examples, TAS 404 can determine an IMEI of MO UE 102 and an IMEI of MT UE 104. In some examples, TAS 404 can determine the identification information from the first service message. For example, the first service message is accompanied by the IP address of MO UE 102. In another example, if the first service message is a SIP message, e.g., a SIP REGISTER request or a SIP INVITE request, including a P-Access-Network-Info (PANI) header, the cell global identity (CGI) of the cell (e.g., the eNodeB 220) serving the MO UE 102 can be retrieved from the "cgi-3gpp" parameter of the PANI header. The cgi-3gpp parameter can include the MCC, MNC, location area code (LAC), and cell identity (CI).

As shown, in some examples, TAS 404 can query the HSS 402 (or other servers, e.g., S-CSCF 232) and receive a response indicating identification information. For example, TAS 404 can query HSS 402 with a Public User Identity specified in a SIP "From" header of the first service message, or an IP address of the MO UE 102, and receive an IMSI. In some examples, if specific identification information cannot be retrieved, the identification information can be determined to include an anonymous-party indicator, e.g., the URL <sip:anonymous@anonymous.invalid>.

At block 410, TAS 404 can retrieve authorization information corresponding to the identification information. For example, TAS 404 can retrieve the authorization from an internal database. In some examples, as shown, TAS 404 can retrieve the authorization information from authorization server 406. For example, TAS 404 can query an EIR using the Diameter protocol to determine the authorization information, e.g., corresponding to an IMEI of MO UE 102. In some examples, TAS 404 can query authorization server 406 for identification information of multiple parties, e.g., MO UE 102 and MT UE 104, in one or more queries. In some examples, TAS 404 can query authorization server 406 for authorization information or other information relating to supplementary services or customized logic for video call service authorization.

At block 412, TAS 404 can determine whether or not the authorization information indicates that the first session attribute is permitted. In some examples, the authorization information can be specific to the first session attribute. In some of these examples, the authorization information can indicate directly whether or not the first session attribute is permitted. In some examples, the authorization information can include permissions for a variety of session attributes. In some of these examples, at block 412, TAS 404 can locate, in the authorization information, permissions corresponding to the first session attribute.

In some examples, the identification information includes a network identifier of visited network 134. For example, the identification information can include information extracted or derived from the PVNI SIP header. The authorization information indicates, for the identified visited network 134, which session attributes are to be downgraded or are disallowed (FIG. 5).

In some examples, HSS 402 can include information about services that are allowed. For example, HSS 402 can store flags or initial filter criteria (IFCs) for various session attributes that are permitted for a particular user. The authorization information can indicate session attributes that are not permitted, notwithstanding the IFCs or other information received from the HSS 402. This can permit controlling access more precisely than using the IFCs alone, and with reduced computational load and storage requirements on HSS 402 or TAS 404.

At block 414, in response to the authorization information indicating the first session attribute is not permitted, TAS 404 can determine a second session attribute different from the first session attribute based at least in part on the first session attribute. TAS 404 can further determine a second service message including information of the second session attribute. TAS 404 can then transmit the second service message to one or more parties of the telecommunication session, e.g., MT UE 104, via communications interface 334. In the illustrated example, the second service message is a SIP INVITE including an SDP body modified, compared to the body of the first service message, to request an audio call ("m=audio") instead of a video call. In some examples of a terminating TAS, downgrade from video to audio can include, e.g., breaking out the terminating leg of the session to a CS network.

Figure 5:
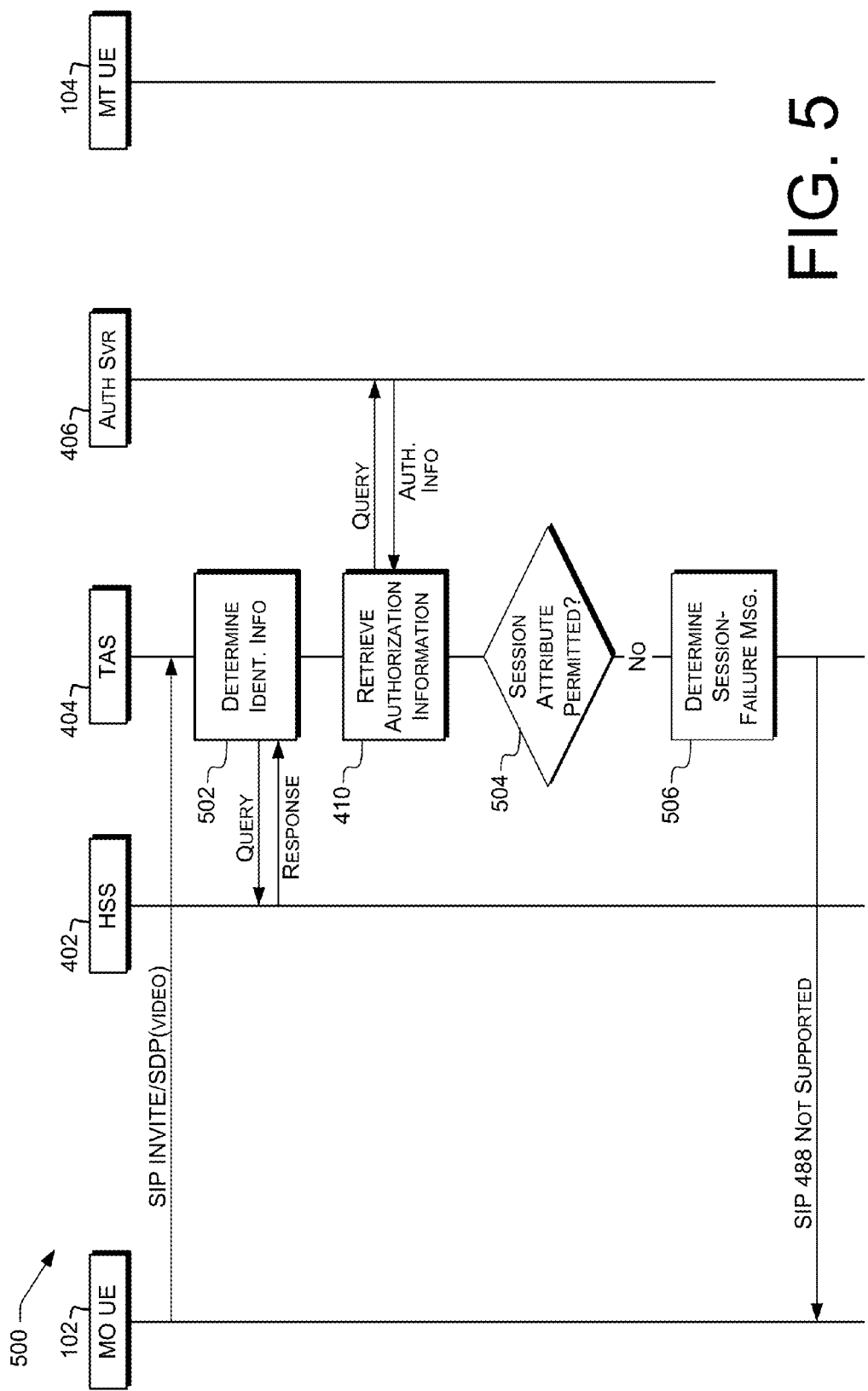
FIG. 5 shows an example call flow illustrating disallowing of requested services.

FIG. 5 shows a call flow 500 illustrating an example of service-failure messages. This call flow is as shown in FIG. 4 except as noted. As in FIG. 4, the first service message requests a video call and (block 412) video calls are not permitted for the session.

At block 502, in some examples, TAS 404 receives, from a profile server such as HSS 402, service-access information associated with a user of MO UE 102.

Block 410 can be as described above with reference to FIG. 4.

At block 504, in some examples, TAS 404 can determine whether the session attribute is permitted as described above with reference to block 412, FIG. 4. In some examples, at block 504, TAS 404 can additionally or alternatively determine that the session attribute is not permitted if the service-access information from HSS 402 indicates the user is not authorized to use the first session attribute. For example, HSS 402 can transmit information from one or more service profiles to TAS 404 (or an S-CSCF, or another anchoring network device, and likewise throughout). TAS 404 can determine, at block 504, that the session attribute is not permitted if the information from the service profiles does not include a profile covering or enabling that session attribute.

At block 506, in response to the authorization information indicating the first session attribute is not permitted, e.g., as discussed above with reference to blocks 412 or 504, TAS 404 can determine a service-failure message based at least in part on the first service message. TAS 404 can then transmit the service-failure message to MO UE 102 via communications interface 334. In the illustrated example, the service-failure message includes a SIP 488. Not Supported response. The service-failure message can additionally or alternatively include other SIP return codes, e.g., in the 4xx, 5xx, or 6xx series, or other error or warning messages defined in other protocols, e.g., MSRP.

Figure 6:
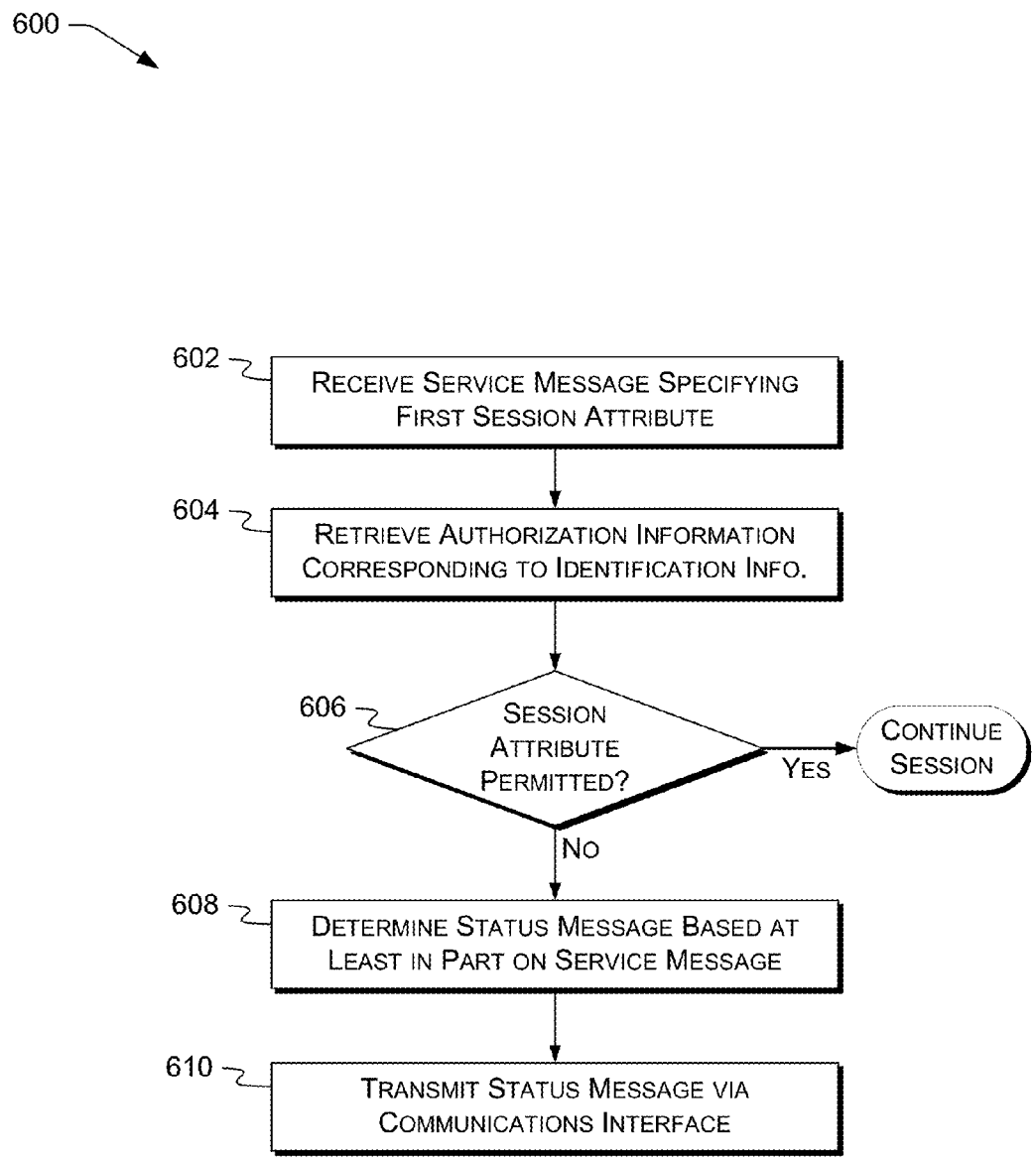
FIG. 6 illustrates an example process for controlling access to network services in a communication session according to some implementations.
Figure 7:
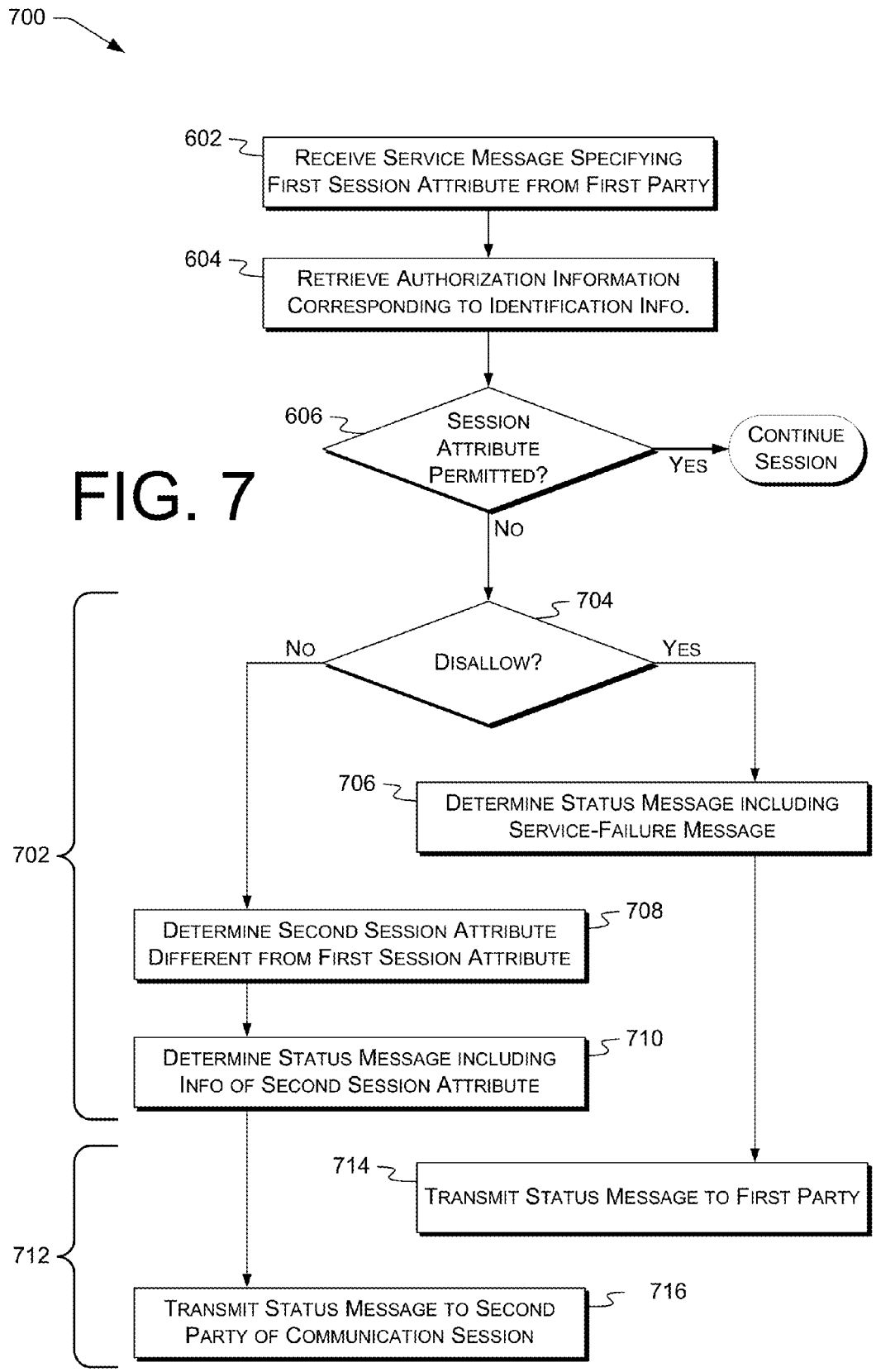
FIG. 7 illustrates an example process for controlling access to network services in a communication session according to some implementations.

FIG. 6 illustrates an example process 600 for controlling a communication session. Process 600 can be performed, e.g., by a core network device, e.g., the server 304, communicatively connectable with user equipment, e.g., computing device 302, of a telecommunications network 306 (all FIG. 2). In some examples, the core network device includes one or more processors (e.g., processor 326) configured to perform operations described below, e.g., in response to computer program instructions of the authorization-processing module 330. Operations shown in FIG. 6 and in FIG. 7, discussed below, can be performed in any order except when otherwise specified, or when data from an earlier step is used in a later step. For clarity of explanation, reference is herein made to various components shown in FIGS. 1-3 that can carry out or participate in the steps of the exemplary method, and to various operations and messages shown in FIGS. 4 and 5 that can occur while the exemplary method is carried out or as part of the exemplary method. It should be noted, however, that other components can be used; that is, exemplary method(s) shown in FIGS. 6 and 7 are not limited to being carried out by the identified components, and are not limited to including the identified operations or messages.

At 602, the server 304, e.g., the processor 326, receives, from a first party of a communication session, a service message including information of a first session attribute and associated with identification information of a party of the communication session (e.g., the first party or another party). This can be done, e.g., as described above with reference to first service message 114, FIG. 1, or TAS 404, FIG. 4. In some examples, the identification information can include an IMEI or other types of identification information described above, e.g., with reference to AS 234, server 304, or block 408.

At 604, the server 304 retrieves, from an authorization registry (e.g., authorization server(s) 122 or authorization registry 332), authorization information corresponding to the identification information. This can be done, e.g., as described above with reference to block 410.

At 606, the server 304 determines whether the first capability is permitted. This can be done, e.g., as described above with reference to blocks 412 or 504. If so, the session can continue as normal. For example, the server 304 can relay the service message including the information of the first session attribute to one or more other parties of the communication session.

In the examples described herein, including examples described with reference to FIGS. 1-7, unless otherwise specified, individual items, e.g., physical items or data items, can be provided or operated on by any combination of the described operations. For example, block 606 can be performed with respect to all of the authorization information provided by block 604, or with respect to less than all of the authorization information provided by block 604. Similarly, any operation described herein can produce data not consumed by a subsequent operation.

At 608, in response to the authorization information indicating the first capability is not permitted, the server 304 can determine a status message based at least in part on the service message. Examples of status messages can include second service messages such as those described above with reference to FIG. 4 and service-failure messages such as those described above with reference to FIG. 5.

At 610, the server 304 can transmit the status message via communications interface 334. For example, server 304 can transmit a status message including a second service message to one or more parties of the communication session, or can transmit a status message including a service-failure message to the first party. Some examples are discussed above with reference to FIG. 2 and below with reference to FIG. 7.

FIG. 7 illustrates an example process 700 for establishing a communication session performed, e.g., by a core network device, e.g., the server 304, FIG. 2. Blocks 602, 604, 606, and 610 can be as discussed above with reference to FIG. 6. Block 606 can be followed by block 702. Block 702 can be an example of block 608, FIG. 6. Block 702 can include blocks 704, 706, 708, or 710. Block 702 can be followed by block 712, which can include blocks 714 or 716 and which can be an example of block 610, FIG. 6.

At block 704, server 304 can determine whether the first session attribute is entirely disallowed, or whether a downgrade (e.g., from video to audio) can be performed. If the first session attribute is disallowed, the next block can be block 706; otherwise, the next block can be block 708.

At block 706, server 304 can determine the status message including a service-failure message. This can be done, e.g., as discussed above with respect to block 506, FIG. 5. Block 706 can be followed by block 714.

At block 708, if the first session attribute is not disallowed, server 304 can determine a second session attribute different from the first session attribute based at least in part on downgrade information associated with the first session attribute. This can be done, e.g., as discussed above with reference to FIG. 4. In some examples, the first session attribute can be a video capability and the second session attribute can be an audio capability At block 710, server 304 can determine the status message including information of the second session attribute. This can be done, e.g., as discussed above with reference to FIG. 4 or block 608.

At block 714, if the first session attribute is disallowed, the status message including the service-failure message can be transmitted to the first party. The service-failure message 124 can be, e.g., a SIP 488 response, as discussed above, e.g., with reference to FIG. 5. In some examples, the service-failure message 124 can include an indication of the session attribute that was disallowed. This can permit, e.g., the MO UE 102, to retry, e.g., without a disallowed attribute. For example, the MO UE 102 can retry a video call as a voice call if the MT UE 104 or terminating network does not support video. Transmitting the service-failure message 124 can reduce load on the network and resource consumption of the application server or other core network device.

At block 716, if the first session attribute is not disallowed, the status message including the information of the second session attribute can be transmitted to a second party of the communication session, e.g., a party different from the first party. This can be done, e.g., as described above with reference to FIG. 4.

Various aspects described above permit allowing, disallowing, or downgrading services, e.g., based on whether a terminal is in a home network or is roaming in a visited network. In some examples, the home network can support IMS or other services such as VoLTE calling, RCS, SMS over IP, or Presence. In some examples, access to some of these services may be restricted on visited networks. For example, access may be restricted based on the operator of the visited network, a combination of the operator and the user of the terminal, or a combination of the operator, the user, and the requested service. As discussed above, technical effects of various examples can include controlling bandwidth usage and inhibiting the spread of malware. Technical effects of various examples can include controlling service access while maintaining rapid call setup times compared to prior schemes using IFC-based control.

Example data transmissions (parallelograms) in FIGS. 1 and 3, example data exchanges in the call flow diagrams of FIGS. 4 and 5, and example blocks in the process diagrams of FIGS. 6 and 7 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A telecommunications network, comprising:
   a home subscriber server (HSS);
   an authorization server that is different from the HSS; and
   an anchoring network device communicatively connectable with user equipment, wherein the anchoring network device is configured to:
      receive from the user equipment a first service message associated with a communication session, the first service message including information of a first session attribute;
      determine identification information of the user equipment, wherein the user equipment is associated with a first party of one or more parties of the communication session and the identification information identifies a visited network in which the user equipment is roaming;
      retrieve authorization information corresponding to the identification information from the authorization server;
      in response to the authorization information indicating the first session attribute is not permitted, determine a second session attribute different from the first session attribute based at least in part on the first session attribute;
      determine a second service message including information of the second session attribute; and
      transmit the second service message to one or more parties of the telecommunication session via a communications interface of the anchoring network device.

2. The telecommunications network of claim 1, wherein the first session attribute and the second session attribute comprise respective capabilities.

3. The telecommunications network of claim 2, wherein the first session attribute is a video capability and the second session attribute is an audio capability.

4. The telecommunications network of claim 1, wherein the first session attribute comprises a first set of one or more parties, and the second session attribute comprises a second set of one or more parties including fewer than all of the parties in the first set of one or more parties.

5. The telecommunications network of claim 1, wherein the first session attribute and the second session attribute comprise respective protocols.

6. The telecommunications network of claim 1, wherein the user equipment is associated with the first party of the telecommunication session and the one or more parties includes a second party different from the first party.

7. The telecommunications network of claim 1, wherein the anchoring network device comprises a Rich Communication Suite (RCS) anchoring network device.

8. The telecommunications network of claim 5, wherein the first session attribute comprises a Rich Communication Suite (RCS) protocol and the second session attribute comprises at least one of a Short Message Service (SMS) protocol or a Multimedia Message Service (MIMS) protocol.

9. The telecommunications network of claim 1, wherein the anchoring network device is further configured to extract or derive the identification information from a P-Visited-Network-ID header of a Session Initiation Protocol (SIP) request.

10. The telecommunications network according to claim 9, wherein the anchoring network device is further configured to receive the identification information via Lightweight Directory Access Protocol (LDAP) or Simple Object Access Protocol (SOAP) over Hypertext Transfer Protocol (HTTP).

11. The telecommunications network according to claim 1, wherein the anchoring network device is further configured to, before retrieving the authorization information:
   receive, from the HSS, service-access information associated with the first party; and
   determine that the first service attribute is permitted in the communication session.

12. The telecommunications network according to claim 1, wherein the identification information further identifies a mobile virtual network operator (MVNO) associated with the user equipment.

13. The telecommunications network according to claim 1, wherein the authorization server comprises a computer-readable memory and is configured to:
   receive a modification instruction via a communications interface of the authorization server; and
   in response, modify a mapping between identification information and authorization information stored in the computer-readable memory.

14. A method comprising, by a processor of an anchoring network device of a telecommunications network:
   receiving, from user equipment of a telecommunications network, a first service message associated with a communication session, the first service message including information of a first session attribute;
   determining identification information of the user equipment, wherein the user equipment is associated with a first party of one or more parties of the communication session and the identification information identifies a visited network in which the user equipment is roaming;
   retrieving authorization information corresponding to the identification information from the authorization server;
   in response to the authorization information indicating the first session attribute is not permitted, determining a second session attribute different from the first session attribute based at least in part on the first session attribute;
   determining a second service message including information of the second session attribute; and
   transmitting the second service message to one or more parties of the telecommunication session via a communications interface of the anchoring network device.

\* \* \* \* \*